(12) United States Patent
Mueckl et al.

(10) Patent No.: US 11,353,325 B2
(45) Date of Patent: Jun. 7, 2022

(54) LEVEL WITH DIGITAL DISPLAY

(71) Applicant: Milwaukee Electric Tool Corporation, Brookfield, WI (US)

(72) Inventors: Gareth J. Mueckl, Milwaukee, WI (US); Eric Mackey, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 189 days.

(21) Appl. No.: 16/796,549

(22) Filed: Feb. 20, 2020

(65) Prior Publication Data
US 2020/0263983 A1  Aug. 20, 2020

Related U.S. Application Data

(63) Continuation of application No. PCT/US2020/018817, filed on Feb. 19, 2020.

(60) Provisional application No. 62/807,948, filed on Feb. 20, 2019.

(51) Int. Cl.
*G01C 9/06* (2006.01)

(52) U.S. Cl.
CPC ......... *G01C 9/06* (2013.01); *G01C 2009/066* (2013.01)

(58) Field of Classification Search
None
See application file for complete search history.

(56) References Cited

U.S. PATENT DOCUMENTS

| | | | |
|---|---|---|---|
| 4,167,818 A | 9/1979 | Cantarella et al. | |
| 4,244,117 A | 1/1981 | Cantarella et al. | |
| 4,503,622 A | 3/1985 | Swartz et al. | |
| 4,716,534 A | 12/1987 | Baucom et al. | |
| 5,025,567 A * | 6/1991 | McWilliams | G01C 9/32 33/348 |
| 5,136,784 A * | 8/1992 | Marantz | G01C 9/06 33/333 |
| 5,956,260 A * | 9/1999 | Heger | G01C 9/06 702/154 |
| 6,058,617 A * | 5/2000 | Nadu | G01C 9/26 33/366.12 |
| 6,836,972 B2 * | 1/2005 | Drahos | G01C 9/06 33/366.11 |

(Continued)

FOREIGN PATENT DOCUMENTS

| | | |
|---|---|---|
| CN | 2509562 | 9/2002 |
| CN | 1414342 | 4/2003 |

(Continued)

OTHER PUBLICATIONS

International Search Report and Written Opinion for International Application No. PCT/US2020/018817, dated Jun. 15, 2020, 12 pages.

*Primary Examiner* — Christopher W Fulton
(74) *Attorney, Agent, or Firm* — Reinhart Boerner Van Deuren s.c.

(57) ABSTRACT

A tool, such as a digital level, includes displays on top and side surfaces of the level. The top surface display provides an additional visual means to communicate the orientation of the level by emitting any of several visual signals. A processor in the level determines a measured orientation of the level and sends a communication signal to the top surface display to emit a selected visual signal based on the measured orientation.

16 Claims, 10 Drawing Sheets

(56) References Cited

U.S. PATENT DOCUMENTS

| | | | | |
|---|---|---|---|---|
| 7,298,888 | B2* | 11/2007 | Hamar | G01C 9/06 |
| | | | | 382/151 |
| 7,472,489 | B2* | 1/2009 | Frank | G01C 9/06 |
| | | | | 33/366.11 |
| 7,743,520 | B1 | 6/2010 | Jiorle | |
| 8,661,701 | B2* | 3/2014 | Wixey | G01B 5/24 |
| | | | | 33/534 |
| 9,885,572 | B2* | 2/2018 | Schwoegler | G01C 9/28 |
| 11,092,435 | B2* | 8/2021 | Leidel | G01C 9/06 |
| 2005/0166410 | A1* | 8/2005 | Richter | G01C 9/06 |
| | | | | 33/366.12 |
| 2007/0180719 | A1* | 8/2007 | Donnelly | B60S 9/02 |
| | | | | 33/366.11 |
| 2007/0193046 | A1* | 8/2007 | Arlinsky | G01C 9/06 |
| | | | | 33/366.11 |
| 2009/0260241 | A1 | 10/2009 | Zhang | |
| 2014/0101950 | A1 | 4/2014 | Zhuang | |
| 2016/0084648 | A1 | 3/2016 | Zhuang | |
| 2018/0266819 | A1 | 9/2018 | Neitzell et al. | |

FOREIGN PATENT DOCUMENTS

| | | | | |
|---|---|---|---|---|
| CN | 201100842 | | 8/2008 | |
| CN | 201885708 | | 6/2011 | |
| CN | 202471057 | | 10/2012 | |
| DE | 3707345 | A1 * | 9/1988 | G01C 9/06 |
| DE | 3735172 | | 2/1990 | |
| GB | 2550370 | A * | 11/2017 | G01C 9/06 |
| KR | 10-1741091 | | 5/2017 | |
| WO | WO9415174 | | 7/1994 | |

\* cited by examiner

Power budget / Run time

**Digital Torpedo w/ 2X AA cells
+ backlit segmented LCD (No Top Display)**

|  | Backlight on | Backlight off |
|---|---|---|
| Run time (Hrs) | 48.8 | 232.5 |
| Power (mW) | 117.8 | 24.7 |

**Digital Torpedo w/ 2X AAA cells
+ backlit segmented LCD (No Top Display)**

|  | Backlight on | Backlight off |
|---|---|---|
| Run time (Hrs) | 19.5 | 93 |
| Power (mW) | 117.8 | 24.7 |

**Digital Torpedo w/ 3X AAA cells
+ backlit segmented LCD (No Top Display)**

|  | Backlight on | Backlight off |
|---|---|---|
| Run time (Hrs) | 29.3 | 139.5 |
| Power (mW) | 117.8 | 24.7 |

LED Top Read Option

**Digital Torpedo w/ 2X AA cells
+ backlit segmented LCD + Top LED Display**

|  | Backlight on | Backlight off |
|---|---|---|
| Run time (Hrs) | 24.4 | 40.3 |
| Power (mW) | 235.8 | 142.7 |

**Digital Torpedo w/ 2X AAA cells
+ backlit segmented LCD + Top LED Display**

|  | Backlight on | Backlight off |
|---|---|---|
| Run time (Hrs) | 9.8 | 16.1 |
| Power (mW) | 235.8 | 142.7 |

**Digital Torpedo w/ 3X AAA cells
+ backlit segmented LCD + Top LED Display**

|  | Backlight on | Backlight off |
|---|---|---|
| Run time (Hrs) | 14.6 | 24.2 |
| Power (mW) | 235.8 | 142.7 |

2X AAA Energizer MAX cells 1.0Ah (2.3 Wh total)
2X Battery discharge voltage from 3.1 to 1.8 V (2.3 V nominal)

FIG. 11

LEVEL WITH DIGITAL DISPLAY

CROSS-REFERENCE TO RELATED PATENT APPLICATION

This application is a continuation of International Application No. PCT/US2020/018817, Feb. 19, 2020, which claims priority to U.S. Provisional Application No. 62/807,948, filed Feb. 20, 2019, both of which are incorporated herein by reference in their entireties.

BACKGROUND OF THE INVENTION

The present disclosure relates generally to the field of levels, and more specifically to a digital level. Levels are used for a variety of applications, particularly in the building and construction trades. Traditionally, to measure orientation a level uses one or more vials that contain a liquid (e.g., ethanol) and a small bubble of gas (e.g., air). The walls of the traditional vial are arcuate-shaped such that when the level is placed on a sufficiently horizontal or vertical surface, the bubble of air is aligned at or near the center of at least one of the vials.

SUMMARY OF THE INVENTION

One embodiment of the disclosure relates to a digital level that includes a primary display on a side face of the level and a supplemental display on a top surface. The top display provides an additional visual means to communicate the orientation of the level to a user. In various embodiments, the visual signals include a first symbol indicating that a side of the level associated with the top display should be lowered, a second symbol indicating that the side of the level associated with the top display should be raised and a third symbol indicating that the level is oriented at a target orientation. In a specific embodiment, the visual signals include a "−" (minus) symbol to indicate that side should be lowered, a "+" (plus) symbol to indicate that side should be raised, and a "O" (circle) symbol to indicate the level is at a target orientation.

In one embodiment, the digital level is a torpedo level and includes a top surface with a display, a side surface with a display, and a processor, such as a microcontroller unit. The processor communicates signals to the top and side displays based on a measured orientation of the level, and the top and side displays display indicia that indicate the level's orientation. The processor includes a built-in display driver (e.g., an LCD driver, which would be used with LCD displays) to interface with the side display. In one embodiment the processor is an E105 MCU (STM8L052) with a built-in LCD driver. The processor may be implemented in software, hardware, firmware, or some combination of the three.

In one embodiment, the top display extends from an edge of a circuit board, such as a Printed Circuit Board Assembly (PCBA). The circuit board includes multiple lights or light sources (e.g., LEDs) that are paired with light pipes to communicate light to emissive components in the display. The circuit board receives a signal indicating which symbol to display and identifies which light or lights should be toggled on. In this embodiment the display does not require an LCD component because the selection of which LEDs to illuminate dictates what symbol the top display will emit. Alternatively, the top display may also include an LCD component to control the symbol being emitted by the top display.

In one embodiment, the top display extends from a face of a circuit board. The circuit board includes multiple lights (e.g., LEDs) that are paired with light pipes to communicate the light to the display. The circuit board receives a signal indicating which symbol to display and identifies which light or lights should be toggled on.

To be Added when Claims Finalized

In one embodiment, a level includes a planar base surface, a top surface opposing the base surface, a primary longitudinal axis, a first end of the level along the primary longitudinal axis, a second end opposing the first end, an orientation sensor configured to measure an orientation of one of the top and base surfaces with respect to the force of gravity, a primary display that displays a first image that corresponds to the measured orientation, and a secondary display that displays a second image that corresponds to the measured orientation.

In another embodiment a level includes a planar base surface, a top surface opposing the base surface, an orientation sensor that measures an orientation of one of the top and base surfaces, a primary display that displays a first image that corresponds to the measured orientation, a secondary display that displays a second image that corresponds to the measured orientation, a light-emitting device, and a light pipe that provides optical communication between the light-emitting device and the secondary display.

In another embodiment a level includes a level body, an interior cavity defined within the body, a planar base surface defined by the level body, a top surface defined by the level body and opposing the base surface, an orientation sensor coupled to the level body and that measures an orientation of one of the top and base surfaces, a light-emitting device located within the interior cavity and coupled to the level body, a light pipe coupled to the light-emitting device, a display positioned adjacent to a surface of the level body, the display coupled to and supported adjacent the surface by the light pipe, the light pipe provides optical communication between the light-emitting device and the display, and the display displays an image visible outside the level body and that corresponds to the measured orientation.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

FIG. 11 is a series of tables showing power usage for different embodiment and power supplies for the digital levels discussed herein, according to exemplary embodiments.

DETAILED DESCRIPTION

Referring generally to the figures, various embodiments of a digital level are shown. Various embodiments of the digital level discussed herein include displays on both top and side surfaces of the digital level. The top display includes emissive components and a circuit board with LEDs. The LEDs and emissive components are in visual communication via light pipes that transmit light emitted by the LEDs to the emissive components.

One advantage of this approach is that it provides robust display capabilities on multiple sides of the level, but does not require the processing, power and component overhead consistent with a more complicated display like an LCD. Because the display requires less complicated processing and hardware support, the development, improvement and maintenance associated with producing and supporting the level is simplified. Not only does this approach reduce the difficulty of manufacturing the top display specifically and the level generally, but it also reduces the required complexity of the software and firmware developed for the level (e.g., an LCD display driver is not required for the level's processor to interact with the top display).

In one embodiment a top display extends from a top edge of a circuit board. The top display provides visual signals indicative of the orientation of the level (e.g., a "+" plus symbol, a "−" minus symbol, and a "O" circle symbol). The top display includes several emissive components that receive light from LEDs on the circuit board. The circuit board receives a signal indicating which signal to emit, and, based on that signal toggles on the appropriate LED(s) that correspond to the emissive components that will produce the appropriate symbol.

Referring to FIGS. 1-5, a level, such as digital level 10, is shown according to an exemplary embodiment. In general, level 10 includes housing 22, front display 20, and top display 30. The level body includes a generally planar base surface and an opposing upper surface (e.g., top surface) that is generally parallel to the planar base surface. As will be generally understood, the base of the level is placed on a workpiece (e.g., a structure, surface, etc.) in order for the user of the level to measure the degree of a surface of the workpiece, including but not limited to whether the surface is level, plumb, or other orientations.

Figure 1:
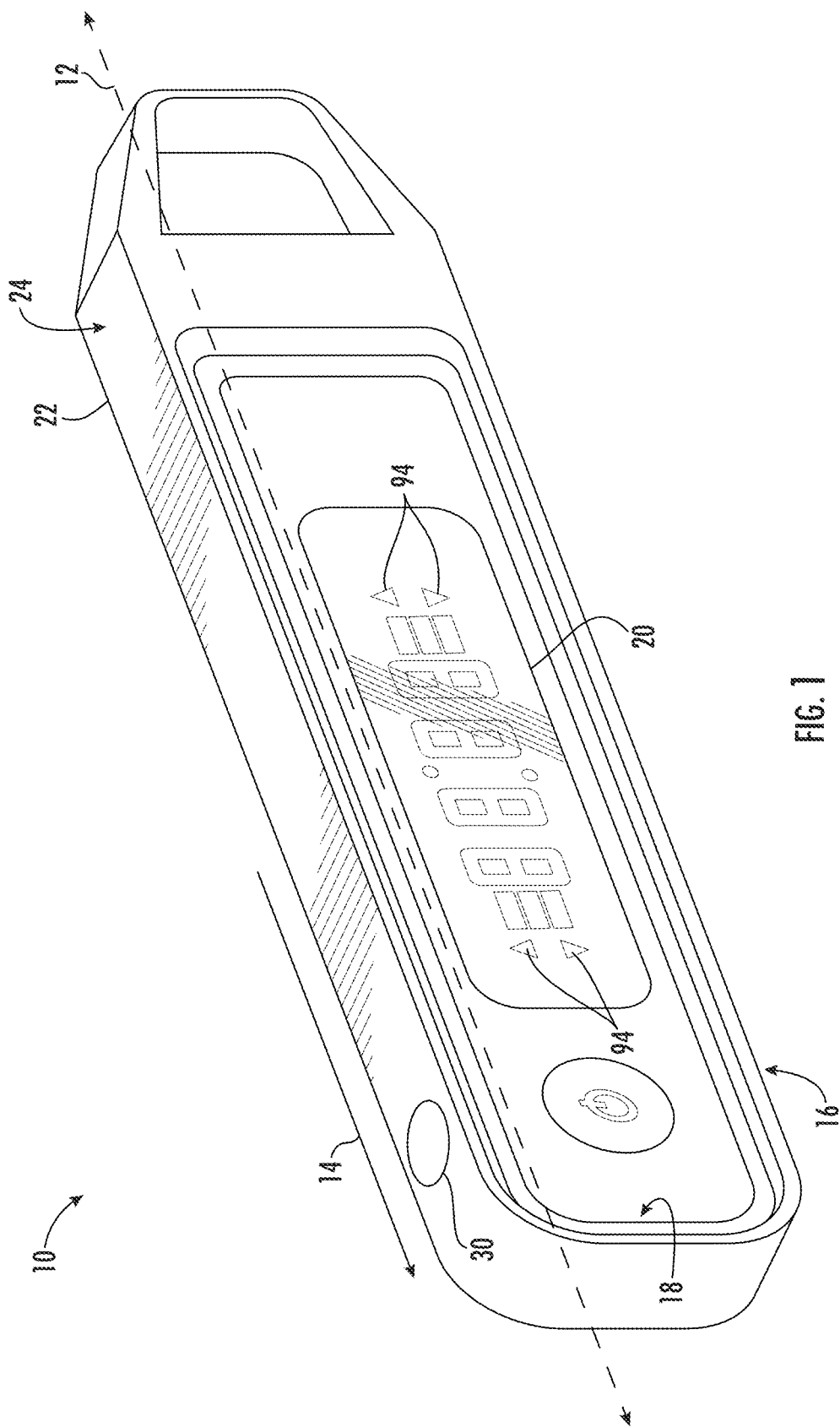
FIG. 1 is a perspective view of a digital level with multiple displays, according to an exemplary embodiment.
Figure 2:
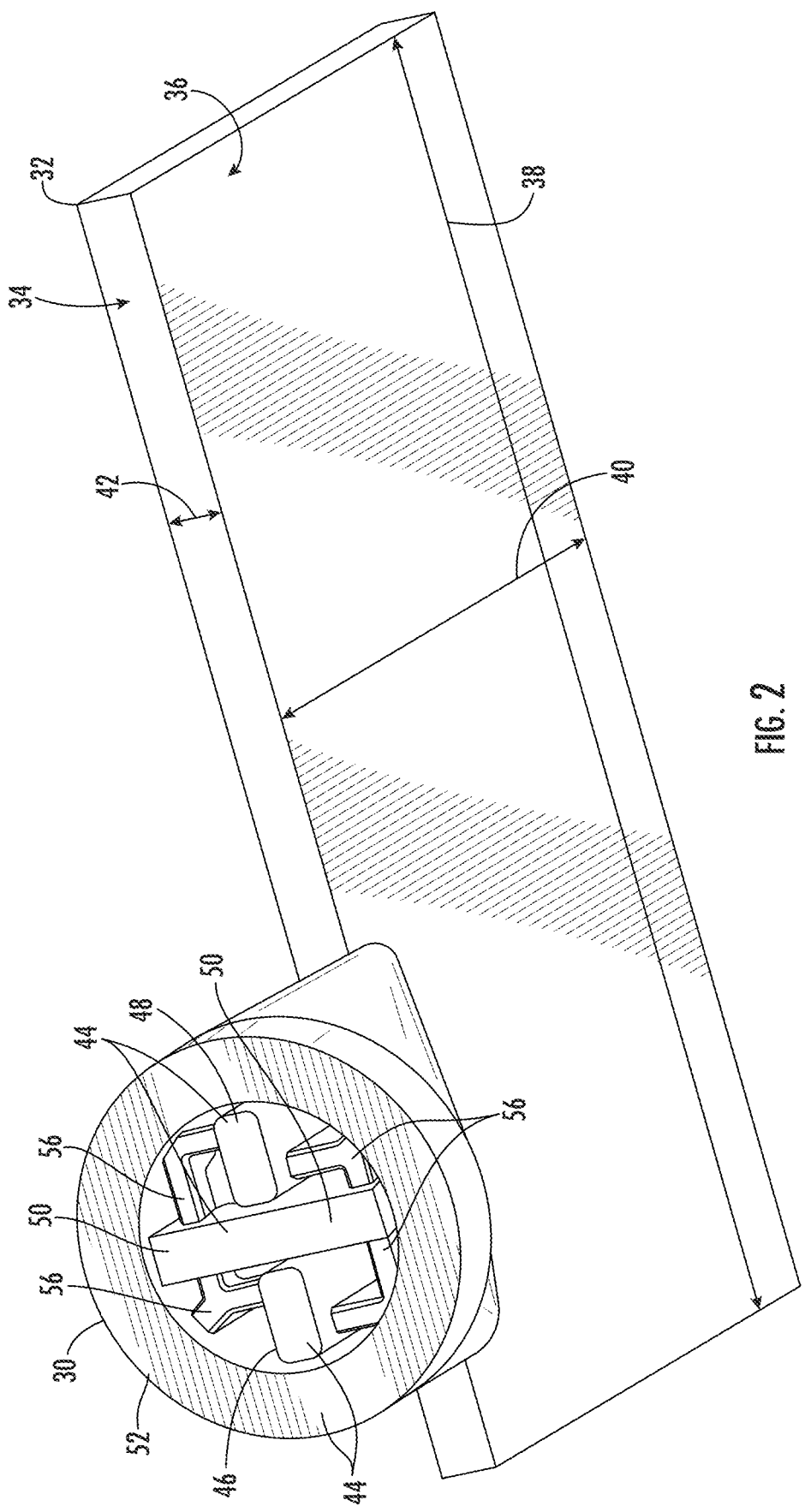
FIG. 2 is a detailed perspective top view of a display extending from an edge of a circuit board, according to an exemplary embodiment.
Figure 3:
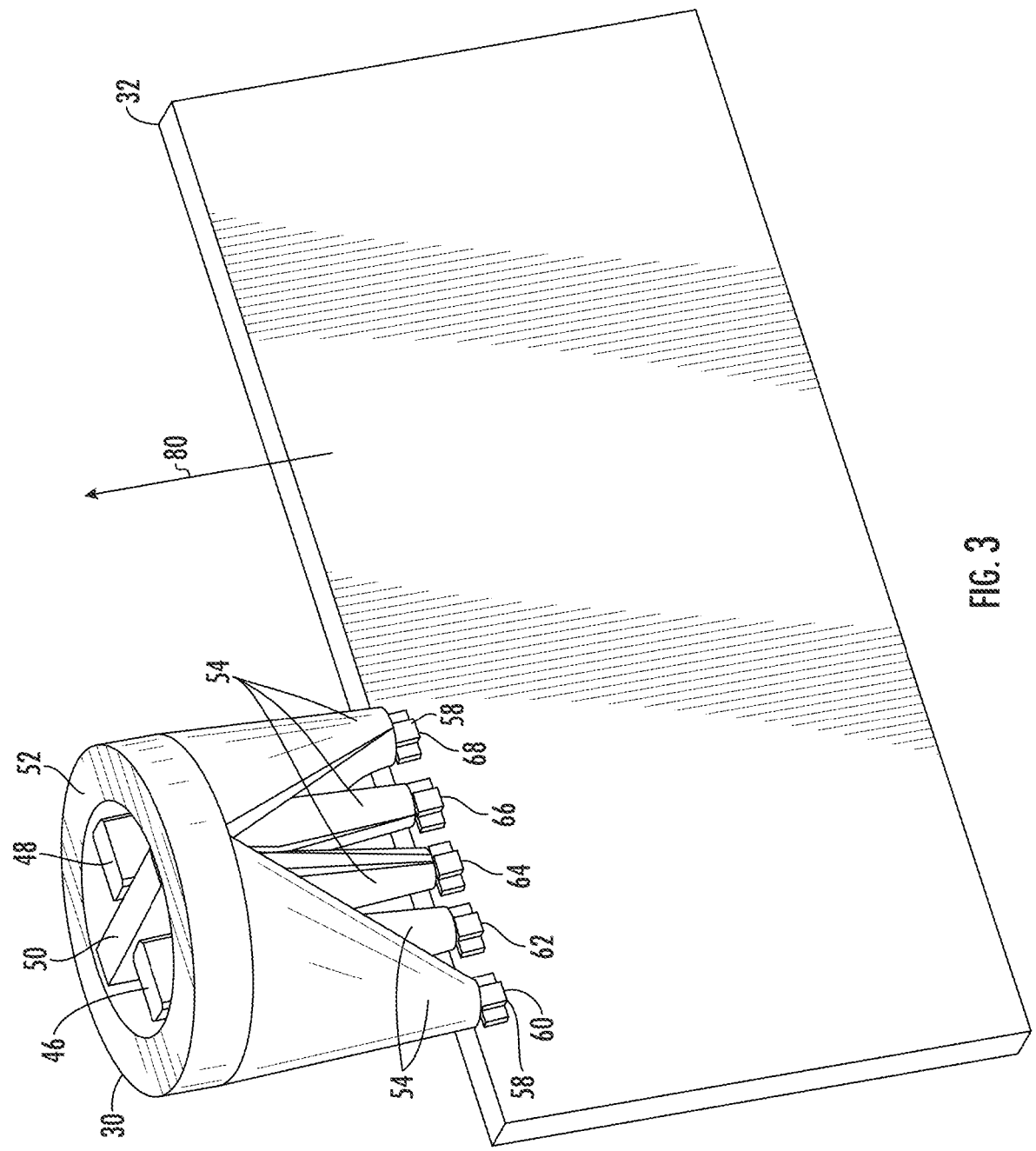
FIG. 3 is a detailed perspective side view of the display of FIG. 2, according to an exemplary embodiment.
Figure 4:
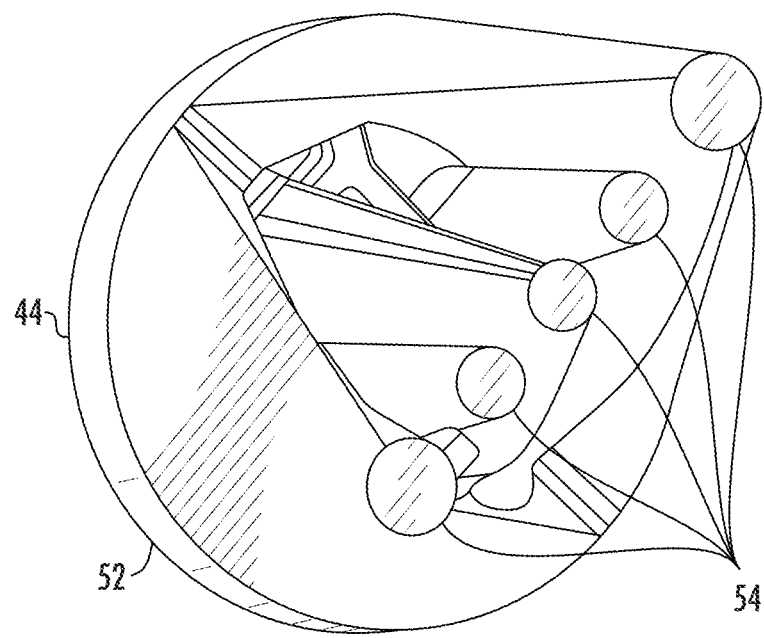
FIG. 4 is a detailed perspective bottom view of the display of FIG. 2, according to an exemplary embodiment.
Figure 5:
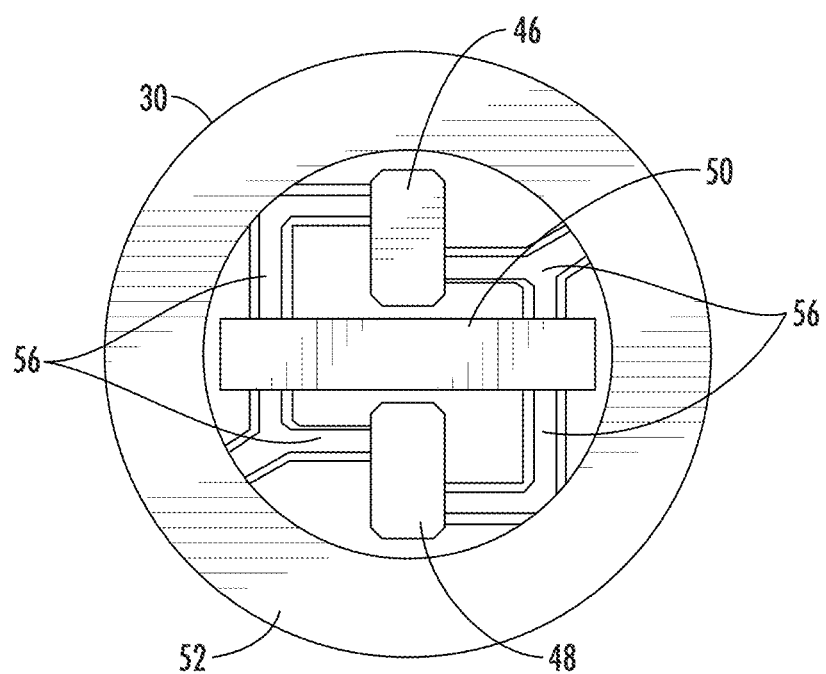
FIG. 5 is a top view of the display of FIG. 2, according to an exemplary embodiment.

Level 10 includes first measuring surfaces 16 on a bottom of level 10 (from the perspective of FIG. 1), and second measuring surfaces 18 on a front of level 10 (from the perspective of FIG. 1). Measuring surfaces 16, 18 provide very flat surfaces and/or edges that permit level 10 to measure the orientation of other objects by placing one of the measuring surfaces 16, 18 against the object being measured. It is considered that level 10 may have any number of measuring surfaces (e.g., 1-6). Level 10 includes a primary longitudinal axis 12 that is aligned with the length of level 10.

Front display 20 is the primary output device and is arranged along an exterior sidewall of housing 22. Front display 20 communicates the orientation of level 10 (e.g., is the level 10 perpendicular to gravity) and receives input from a user. Top display 30 is a secondary output device and is arranged on an upper surface 24 of housing (from the perspective of FIG. 1). Top display 30 provides digital I/O for users.

Turning to FIGS. 2-5, top display 30 is coupled to board 32, which is shown as circuit board 32, and extends from top edge 34 of board 32. Top display 30 provides visual signals indicative of the orientation of level 10. For example, if top display 30 emits a first visual signal, such as a "+" (plus) symbol, then the side of level 10 with top display 30 is too low and level 10 needs to be rotated so that top display 30 is raised. If top display 30 emits a second visual signal, such as a "−" (minus) symbol, then the side of level 10 with top display 30 is too high and level 10 needs to be rotated so that top display 30 is lowered. If top display 30 emits a third visual signal, such as a "O" (circle) symbol, then level 10 has an orientation within a threshold of a target orientation. The target orientation of level 10 may be configured by the user dynamically. For example, the target orientation of level 10 may be perpendicular to gravity (i.e., parallel to level ground), parallel to gravity (e.g., plumb) or any selected orientation (e.g., a 45 degree angle between longitudinal axis 12 of level 10 and level ground).

To emit these symbols, top display 30 includes several emissive components 44, including first and second elevating symbol lights 46, 48, lowering symbol light 50, and level symbol light 52. Emissive components 44 are supported by supports 56 and receive light emitted by LEDs 58 via light pipes 54. Light pipes 54 provide optical communication between one or more LEDs 58 and one or more emissive components 44, such as by channeling light from LEDs 58 to emissive components 44. In one embodiment light pipes 54 surround LEDs 58 and therefore capture much of the light emitted by LEDs 58. In one embodiment LEDs 58 are right-angle LEDs that emit light perpendicularly to the surface to which they are attached (best shown FIG. 3).

LEDs 58 include first LED 60, second LED 62, third LED 64, fourth LED 66 and fifth LED 68. In the embodiment depicted, each LED 58 emits light via light pipes 54 to a single emissive component 44. First LED 60 and fifth LED 68 emit light to level symbol 52 (e.g., the "O" symbol). Second LED 62 and fourth LED 66 emit light to first and second elevating symbols 46, 48, respectively (e.g., the "|" component of the "+" symbol). Third LED 64 emits light to lowering symbol 50 (e.g., both the "−" symbol and the "−" component of the "+" symbol). It should be understood, that while the embodiments discussed herein are discussed in terms of symbols "+", "−" and "O", any symbols suitable to provide the various indications discussed herein may be used.

In use, when level 10 is determined to be within a threshold of the target orientation, first and fifth LEDs 60, 68 are toggled on and emit light to level symbol 52, which then emits a "O" symbol indicating to the worker that level 10 is level. On the other hand, when top display 30 of level 10 is determined to be too low, then second, third and fourth LEDs 62, 64, 66 are toggled on and emit light to first and second elevating symbols 46, 48 and lowering symbol 50, which then emits a "+" symbol indicating to the worker that the side of level 10 with top display 30 needs to be raised. When top display 30 of level 10 is determined to be too high, then third LED 64 is toggled on and emits light to lowering symbol 50, which then emits a "−" symbol indicating to the worker that the side of level 10 with top display 30 needs to be lowered.

In the embodiment depicted top display 30 is disposed on an end of level 10 opposite the handle. In another embodiment, top display 30 is disposed on the same end of level 10 as the handle. In either arrangement of top display 30, the "+" and "−" symbols indicate whether the side of level 10 including top display 30 should be moved up or down, respectively.

As described herein, top display 30 extends from top edge 34 and face 36 of board 32. Board 32 comprises length 38, height 40, and width 42. Although a certain length, height and width is depicted, other lengths, heights and widths for board 32 may be utilized and still practice this disclosure.

Figure 6:
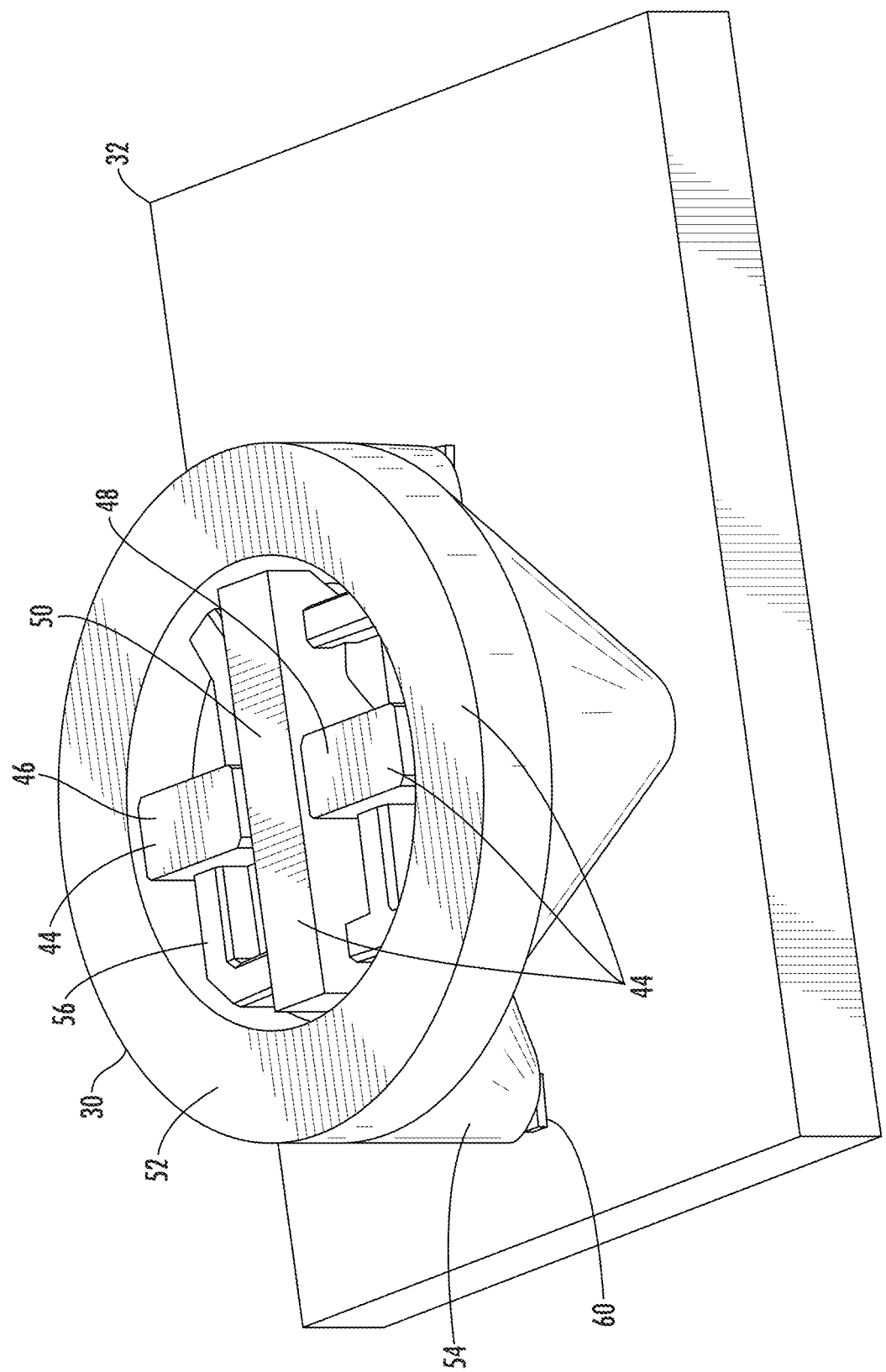
FIG. 6 is perspective top view of a display extending from a face of a circuit board, according to an exemplary embodiment.
Figure 7:
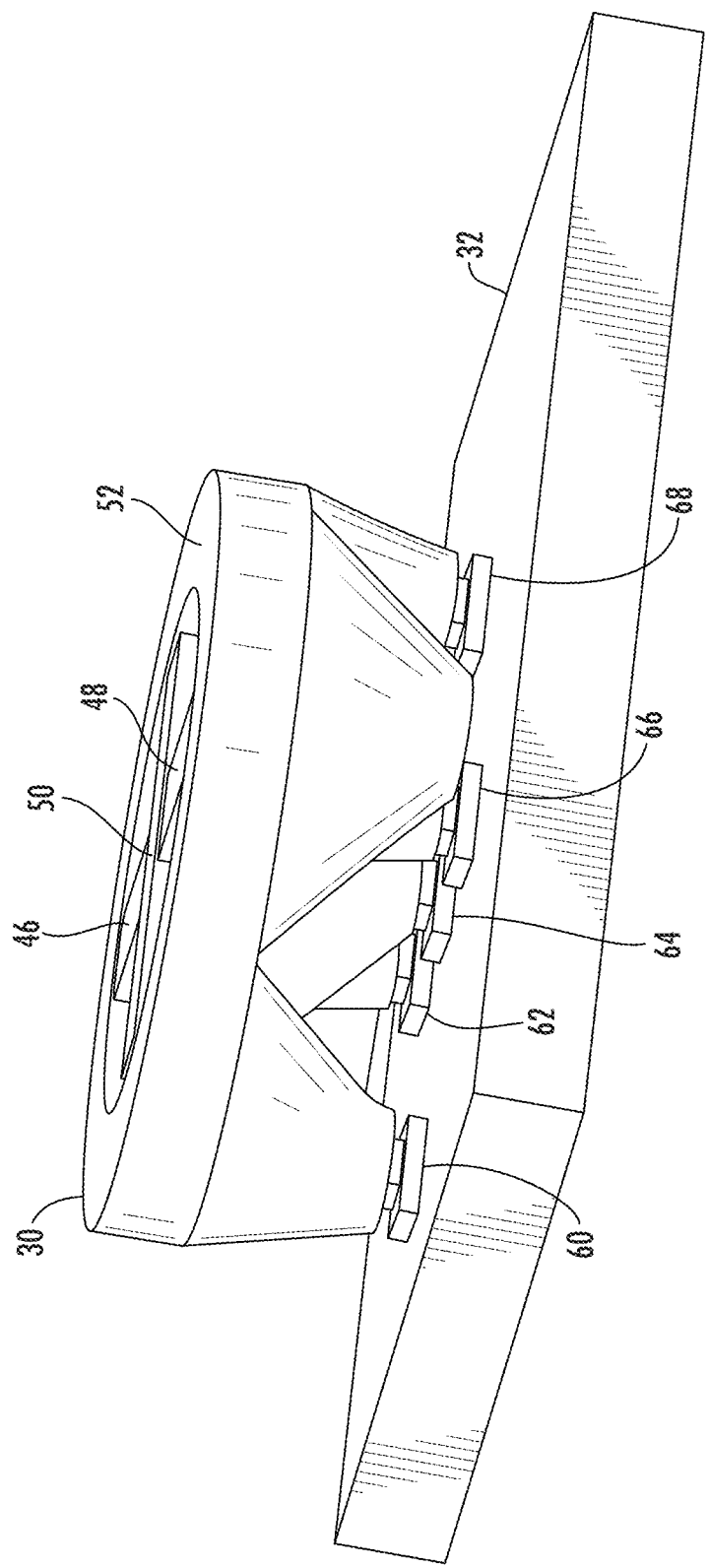
FIG. 7 is a detailed perspective side view of the display of FIG. 6, according to an exemplary embodiment.

Turning to FIGS. 6-7, top display 30 in this embodiment extends from face 36 of board 32. In this embodiment top display 30 again comprises emissive components 44 receiving light from LEDs 58 to emit the "+", "−" and "O" symbols.

Figure 8:
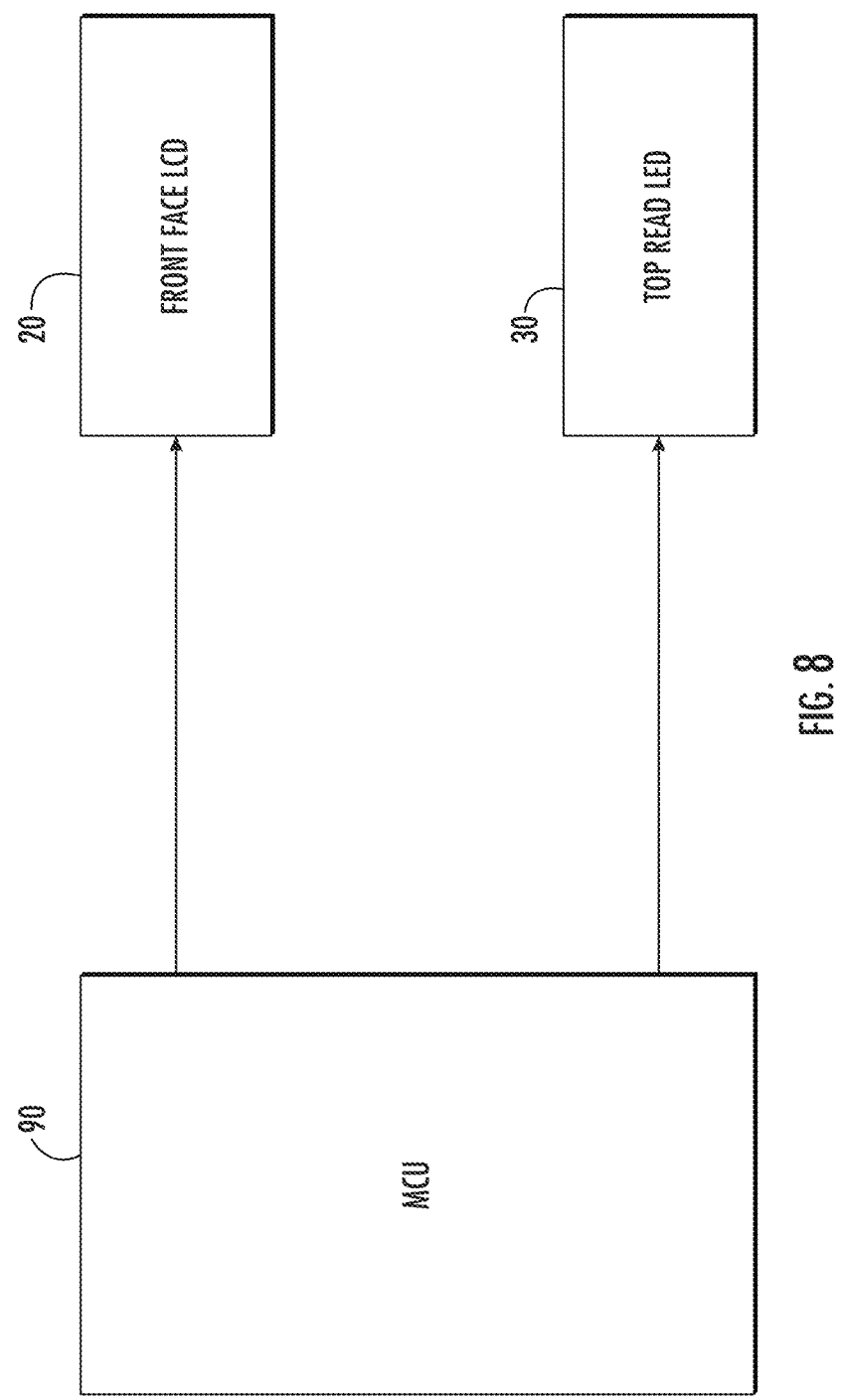
FIG. 8 is a display system schematic of a digital level, according to an exemplary embodiment.

Turning to FIG. 8, processor 90, shown as MCU 90, controls front display 20 and top display 30 via the depicted schematic. In this embodiment front display 20 is an LCD display or similar (e.g., OLED) and top display 30 is the LED-based display described above.

Figure 9:
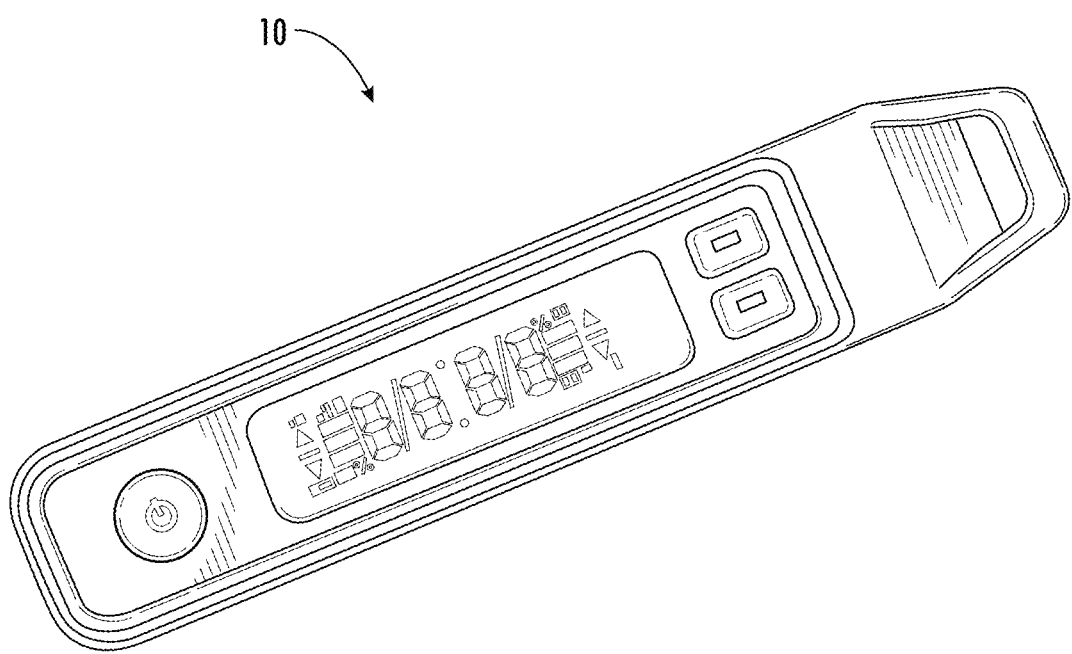
FIG. 9 is a perspective view of a digital level with multiple displays, according to an exemplary embodiment.

Turning to FIG. 9, illustrated therein is an exemplary embodiment of level 10. Level 10 includes front display 20, a user interface including multiple buttons and inputs, and a handle at one longitudinal end of the level.

Figure 10:
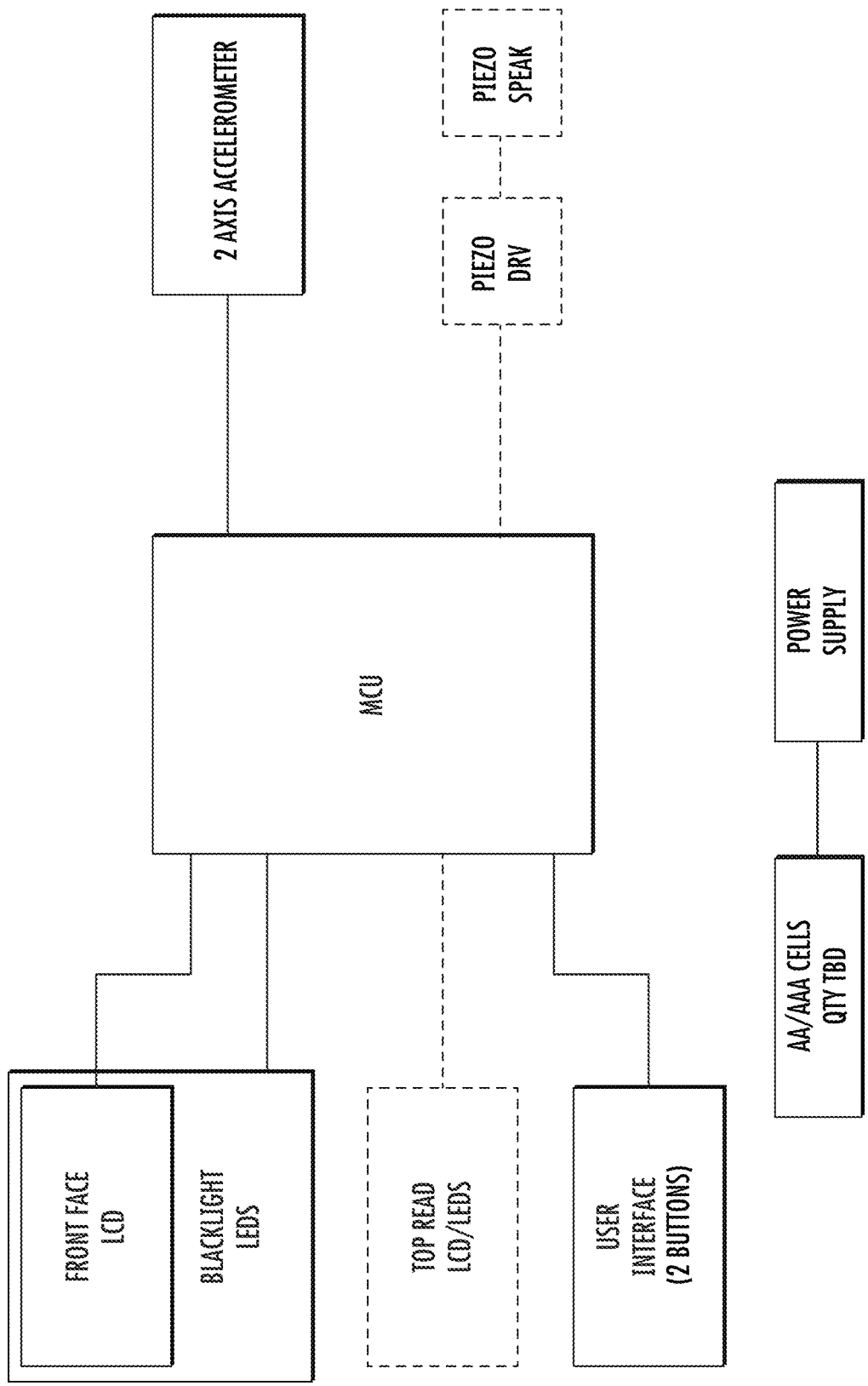
FIG. 10 is an electronic system schematic of a digital level, according to an exemplary embodiment.

Turning to FIG. 10, illustrated therein are circuit diagrams of digital level 10. The upper circuit diagram includes an MCU in communication with a front face LCD, including one or more backlight LEDs, a top display 30, which may be an LCD or an LED, a user interface including buttons, an accelerometer component, and a piezo driver coupled to a piezo speaker. In one embodiment, the accelerometer component comprises dual accelerometers that are arranged perpendicularly with respect to each other (e.g., the first accelerometer is rotated 45 degrees in one direction with respect to level ground, and the second accelerometer is rotated 45 degrees in the opposite direction). In one embodiment, the power supply for level 10 includes one or more batteries selected from one of AA batteries or AAA batteries.

Turning to FIG. 11, illustrated therein are a series of power measurements for exemplary configurations of a digital level in various configurations and operational states.

In a specific embodiment the primary display (e.g., front display 20) is positioned on a side surface of digital level 10. In a specific embodiment the primary display (e.g., front display 20) is positioned on a surface of level other than the top surface, and the secondary display (e.g., top display 30) is positioned on the top surface. In a specific embodiment, the primary display (e.g., front display 20) defines an area larger than the area defined by the secondary display (e.g., top display 30).

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A level comprising:
    a planar base surface;
    a top surface opposing the base surface;
    a primary longitudinal axis;
    a first end of the level along the primary longitudinal axis;
    a second end opposing the first end;
    an orientation sensor configured to measure an orientation of one of the top and base surfaces with respect to the force of gravity;
    a primary display that displays a first image that corresponds to the measured orientation; and
    a secondary display that displays a second image that corresponds to the measured orientation;
    wherein the secondary display displays a plurality of images, including the second image, that correspond to the measured orientation;
    wherein the plurality of images comprises the second image that indicates the first end should be raised relative to the second end, a third image that indicates the first end should be lowered relative to the second end, and a fourth image that indicates the first end is at a target orientation with respect to the second end;

wherein the secondary display comprises a first display element and a second display element that are selectively illuminated to indicate a plurality of orientations of one of the top and base surfaces; and wherein the first display element is illuminated in the second image and the third image but is not illuminated in the fourth image.

2. The level of claim 1, wherein the second display element is not illuminated in the second image and the third image but is illuminated in the fourth image.

3. The level of claim 1, further comprising:
a side surface extending between the base surface and the top surface, wherein the primary display is positioned along the side surface.

4. The level of claim 3, wherein the secondary display is closer to the first end than the second end.

5. The level of claim 1, wherein the primary display is positioned along a surface of the level other than the top surface, and wherein the secondary display is positioned along the top surface.

6. A level comprising:
a planar base surface;
a top surface opposing the base surface;
a primary longitudinal axis;
a first end of the level along the primary longitudinal axis;
a second end opposing the first end;
an orientation sensor configured to measure an orientation of one of the top and base surfaces with respect to the force of gravity;
a primary display that displays a first image that corresponds to the measured orientation;
a secondary display that displays a plurality of images that correspond to the measured orientation;
a light-emitting device; and
a light pipe that provides optical communication between the light-emitting device and the secondary display;
wherein the plurality of images comprises a second image that indicates the first end should be raised relative to the second end, a third image that indicates the first end should be lowered relative to the second end, and a fourth image that indicates the first end is at a target orientation with respect to the second end;
wherein the secondary display comprises a first display element and a second display element that are selectively illuminated to indicate a plurality of orientations of one of the top and base surfaces; and
wherein the first display element is illuminated in the second image and the third image but is not illuminated in the fourth image.

7. The level of claim 6, wherein the primary display defines a first display area, and wherein the secondary display defines a second display area smaller than the first display area.

8. The level of claim 6, further comprising:
a side surface extending between the base surface and the top surface, wherein the primary display is positioned along the side surface, and wherein the secondary display is positioned along the top surface.

9. The level of claim 6, wherein the secondary display comprises a plurality of display elements including the first and second display elements, and wherein the plurality of display elements are selectively illuminated, by selective control of the light-emitting device, to indicate the plurality of orientations of one of the top and base surfaces.

10. The level of claim 9, further comprising a plurality of light-emitting devices including the light-emitting device, wherein at least two of the plurality of light-emitting devices are in optical communication with a single display element of the plurality of display elements.

11. A level comprising:
a level body;
an interior cavity defined within the body;
a planar base surface defined by the level body;
a top surface defined by the level body and opposing the base surface;
a primary level longitudinal axis;
a first end of the level along the primary level longitudinal axis;
a second end opposing the first end;
an orientation sensor coupled to the level body and configured to measure an orientation of one of the top and base surfaces with respect to the force of gravity;
a light-emitting device located within the interior cavity and coupled to the level body;
a light pipe coupled to the light-emitting device;
a display positioned adjacent to a surface of the level body, the display coupled to and supported adjacent the surface by the light pipe, the light pipe provides optical communication between the light-emitting device and the display, the display displays a plurality of images that are visible outside the level body and that correspond to the measured orientation;
wherein the plurality of images comprises a first image that indicates the first end should be raised relative to the second end, a second image that indicates the first end should be lowered relative to the second end, and a third image that indicates the first end is at a target orientation with respect to the second end;
wherein the display comprises a first display element and a second display element that are selectively illuminated to indicate a plurality of orientations of one of the top and base surfaces; and
wherein the first display element is illuminated in the first image and the second image but is not illuminated in the third image.

12. The level of claim 11, further comprising:
an electronics board coupled to the level body, wherein the light-emitting device is directly coupled to the electronics board, and wherein the light pipe is directly coupled to the electronics board.

13. The level of claim 12, wherein the electronics board defines a primary board longitudinal axis, and wherein the light pipe extends from the electronics board perpendicularly to the primary board longitudinal axis.

14. The level of claim 11, wherein the light pipe is directly coupled to the light-emitting device.

15. The level of claim 11, further comprising a plurality of light pipes including the light pipe, wherein the display comprises a plurality of display elements including the first and second display elements, wherein the plurality of display elements are selectively illuminated to indicate the plurality of orientations of one of the top and base surfaces, and wherein the plurality of display elements are coupled to at least one of the plurality of light pipes.

16. The level of claim 15, further comprising a support that is coupled to at least two of the plurality of display elements.

* * * * *